United States Patent [19]
Sase et al.

[11] Patent Number: 5,457,290
[45] Date of Patent: Oct. 10, 1995

[54] CATALYZER-CONTAINING MUFFLER

[75] Inventors: Toshitsugu Sase; Michiaki Matsuda, both of Tokyo, Japan

[73] Assignee: Ebara Corporation, Tokyo, Japan

[21] Appl. No.: 272,633

[22] Filed: Jul. 11, 1994

Related U.S. Application Data

[63] Continuation of Ser. No. 135,427, Oct. 12, 1993, abandoned, which is a continuation of Ser. No. 788,539, Nov. 6, 1991, abandoned.

[30] Foreign Application Priority Data

Jul. 11, 1990 [JP] Japan .................................. 2-302264

[51] Int. Cl.$^6$ ........................................... F01N 1/24
[52] U.S. Cl. ............................ 181/258; 181/272; 60/299; 60/302
[58] Field of Search ........................ 181/222, 231, 181/232, 252, 256, 258, 264, 272, 282; 60/288, 289, 299, 302

[56] References Cited

U.S. PATENT DOCUMENTS

| | | | |
|---|---|---|---|
| 2,938,593 | 5/1960 | Miller et al. | 181/268 |
| 3,445,196 | 5/1969 | Thomas | 181/258 |
| 3,597,165 | 8/1971 | Keith et al. | 60/299 |
| 3,698,875 | 10/1972 | Yamada | 60/299 |
| 4,094,644 | 6/1978 | Wagner | 181/258 |
| 4,866,932 | 9/1989 | Morita et al. | 66/288 |
| 4,890,690 | 1/1990 | Fischer et al. | 181/258 X |

Primary Examiner—Khanh Dang
Attorney, Agent, or Firm—Wenderoth, Lind & Ponack

[57] ABSTRACT

A catalyzer-containing muffler for treating exhaust gas from an engine is disclosed. The muffler includes an outer casing defining a closed space therein and having an inlet pipe and an outlet pipe for introducing and discharging the exhaust gas into and out of the outer casing, respectively. At least one partition wall is provided so as to divide the closed space of the outer casing into two or more spaces. At least one penetration pipe is provided through each of the partition walls for placing the divided spaces in communication with each other, and a catalyzer is provided inside at least one of the penetrating pipes. Exhaust gas noise is thus reduced and at the same time toxic substances such as $NO_x$ or $SO_x$ are removed by the muffler by a single structure.

7 Claims, 4 Drawing Sheets

333333

CATALYZER-CONTAINING MUFFLER

This is a Continuation application of U.S. Ser. No. 08/135,427 filed Oct. 12, 1993, and now abandoned, which is in turn a Continuation application of U.S. Ser. No. 07/788,539 filed Nov. 6, 1991 and now abandoned.

BACKGROUND OF THE INVENTION

1. Field of the Invention

The present invention relates to a catalyzer-containing muffler wherein a catalyzer is provided inside the casing of the muffler.

2. Prior Art

In recent years, as environmental problems have been drawing more public-attention, more stringent regulations for exhausted gases and noise from internal combustion engines have been enacted. In order to comply with these regulations, mufflers and exhaust-gas cleaners have become indispensable for internal combustion engines.

Generally, in the use of an internal combustion engine, provision of both a muffler and an exhaust-gas cleaner, such as a denitration or desulfuration device is indispensable. The muffler for an internal combustion engine usually includes a two-stage muffling structure in order to sufficiently reduce noises. The provision of these muffler and the exhaust-gas cleaner, however, conventionally requires a substantial space for their installation. Although efforts have been made to reduce the size of these devices, such an effort has limitations, since the muffler and the exhaust-gas cleaner respectively require a certain volume to accomplish their effect, i.e. noise reduction space for the muffler and exhaust gas treating space for the denitration device. Another problem is that since the two devices have to be prepared and installed separately, the use of these devices are costly. Particularly, in a low-power engine, the cost of the two devices comprises a substantial portion of the total cost, which is a substantial obstacle to the provision of these devices in the low-power engines.

SUMMARY OF THE INVENTION

The object of the present invention is, therefore, to solve the above-mentioned problems of the prior art by providing a catalyzer-containing muffler which can perform a dual function of reducing noise and carrying out a process of cleaning exhaust gas, such as denitration or desulfuration.

To accomplish the above-mentioned object, a catalyzer-containing muffler of the present invention comprises: an outer casing defining a closed space therein; an inlet pipe and an outlet pipe provided in said outer casing for introducing and discharging an exhaust gas into and out of said outer casing, respectively; at least one partition wall dividing the closed space of said outer casing into two or more divided spaces; at least one penetration pipe extending through each said partition wall for placing said divided spaces in communication with each other; and a catalyzer provided inside at least one of said penetrating pipes.

During operation, the exhaust gas flows through the inlet pipe into one of the spaces formed by the partition walls inside the casing, and flows through the penetrating pipe into another space, and then continues to flow until it finally flows out through the outlet pipe. As a result of the wide space-portions and the narrow pipe-portions of the gas passage, the exhaust-gas flow experiences cycles of rapid expansion and rapid reduction. Thus, the noise level of the exhaust gas is reduced. The cleaning of the exhaust gas, such as denitration or desulfuration, is performed by the catalyzer provided inside the penetrating pipe or pipes.

The above and other objects, features and advantages of the present invention will become more apparent from the following description when taken in conjunction with the accompanying drawings in which preferred embodiments of the present invention are shown by way of illustrative examples.

DETAILED DESCRIPTION OF THE PREFERRED EMBODIMENTS

Figure 1:
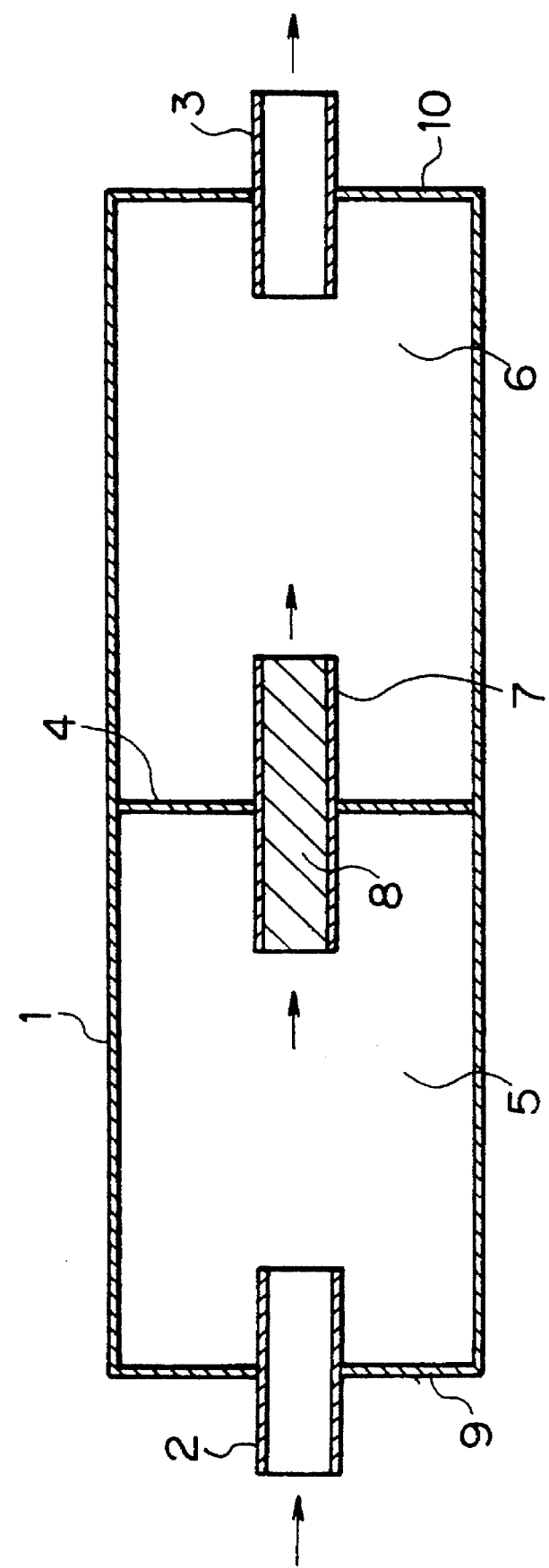
FIG. 1 is a schematic section view of one embodiment of a catalyzer-containing muffler according to the present invention.

Preferred embodiments of the present invention will be described with reference to the drawings hereinafter.

A cylindrical outer casing 1 has its two ends sealed by blind plates 9, 10 to define a closed space therein. The blind plates 9, 10 are penetrated by inlet and outlet pipes 2, 3 respectively, with one end of each of the pipes protruding inside the casing 1 and the other end being outside. The inside of the casing 1 is divided by a partition wall 4 into spaces 5 and 6. The partition wall 4 is penetrated by a penetrating pipe 7, with the ends thereof protruding into the spaces 5, 6. The penetrating pipe 7 contains a catalyzer 8 which removes $NO_x$ or $SO_x$ from the exhaust gas passing therethrough. As the catalyzer, for example, deep root neo-honeycomb catalysts or metal oxide catalysts may be used for removing $NO_x$ or $SO_x$.

In a catalyzer-containing muffler as described above, the exhaust gas flows in the direction indicated by the arrows through the inlet pipe 2 into the space 5 and flows through the penetrating pipe 7 into the space 6, and then flows out of the casing 1 through the outlet pipe 3.

When the exhaust gas flows into and out of the casing 1 through the inlet pipe 2 and outlet pipe 3, respectively, the volume of the exhaust gas is rapidly expanded and reduced, respectively. Thus, the noise level of the exhaust gas is substantially reduced.

The penetrating pipe 7 has two basic functions. One is to let the exhaust gas flow from the space 5 to the space 6. The other is to rapidly restrict the area through which the exhaust gas will flow and then allow this area to be expanded, thus reducing the exhaust gas noise. A most efficient noise reduction can be achieved by selecting a penetrating pipe 7 having an appropriate width and length.

The catalyzer 8 provided in the penetrating pipe 7 cleans the exhaust gas passing therethrough by removing toxic substances such as $NO_x$ or $SO_x$ by promoting the chemical reactions of those substances.

Figure 2:
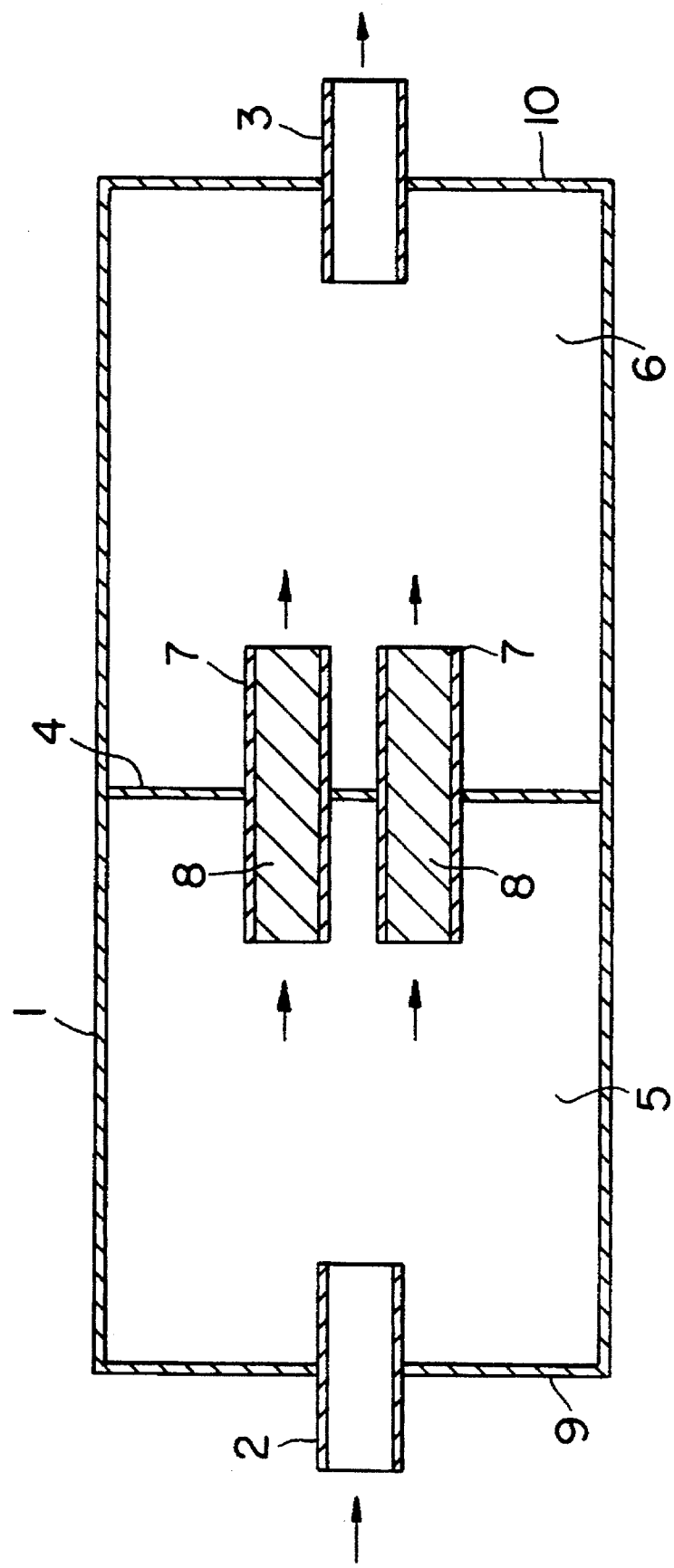
FIG. 2 is a schematic sectional view of another catalyzer-containing muffler according to the invention.
Figure 3:
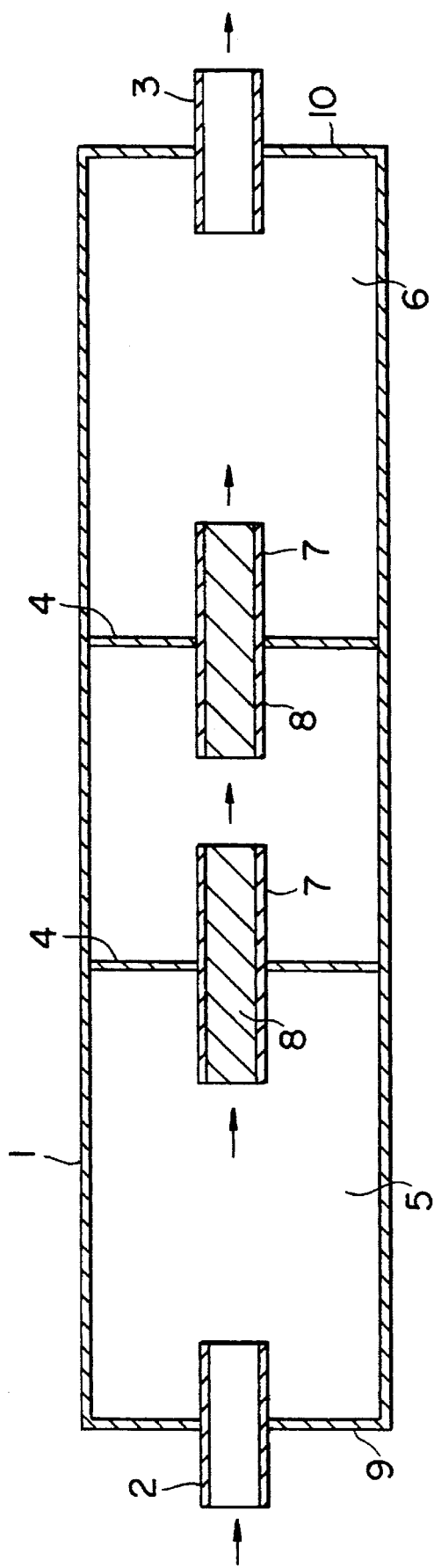
FIG. 3 is a schematic sectional view of still another catalyzer-containing muffler according to the present invention.
Figure 4:
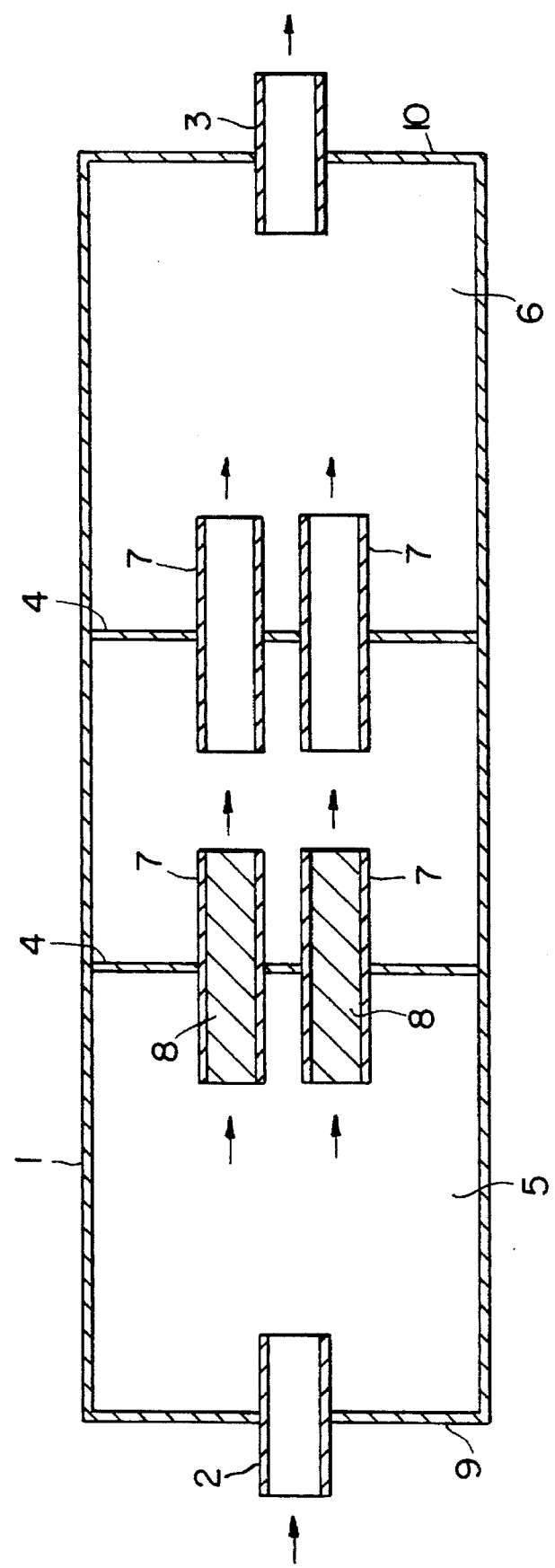
FIG. 4 is a schematic sectional view of yet another catalyzer-containing muffler according to the present invention.

Although, in the above embodiment, the inside of the casing 1 is divided by one partition wall 4 into two spaces 5 and 6, the inside thereof may be divided by two or more partition walls into three or more spaces, with each of the partition walls 4 being provided with a penetrating pipe 7. In such a case, the catalyzer 8 may be provided in either all or some of the penetrating pipes 7. (FIG. 3) Also, one partition wall may carry two or more penetrating pipes 7, and not necessarily only one as in this embodiment. (FIG. 2)

Also, the outer casing 1 need not be cylindrical but may be any suitable shape, such as columnar with rectangular, elliptical or the like cross sections.

The inlet and outlet pipes 2, 3 do not necessarily have to protrude into the spaces 5, 6 respectively. The lengths of the protruding portions may be adjusted to attain the best noise reduction.

Also, the inlet and outlet pipes 2, 3 do not have to be located in the blind plates 9, 10 at the ends of the casing 1 but may extend through the side wall of the casing 1.

Further, the catalyzer in the penetrating pipe 7 is not limited to the ones for removing $NO_x$ or $SO_x$ from the exhaust gas but may be ones for removing other toxic substances from the exhaust gas.

As described above, a catalyzer-containing muffler according to the present invention is able to perform both noise reduction and cleaning of exhausted gas, such as removal of $NO_x$ or $SO_x$. Thus, the required installation space is greatly reduced since the exhaust gas cleaner, which is conventionally separated from the muffler, is placed inside the muffler in the present invention.

Also, the cost for providing the exhaust gas treatment device can be greatly reduced since the catalyzer for treating the exhaust gas is provided in the muffler.

We claim:

1. A catalyzer-containing muffler comprising:

an outer tubular casing defining a space therewithin;

means for forming a gas passage through said casing having a series of alternating wide and narrow portions in which gas passing along said passage will experience cycles of rapid reduction and expansion to such an extent as to reduce the noise of said gas, said means including at least two partition walls spaced apart in the axial direction of said tubular casing and separating the interior of said casing into at least three discrete spaces forming the wide portions of said gas passage, an inlet pipe placing the outside of said casing in communication with one of said discrete spaces, a plurality of penetration pipes each consisting of a solid tubular wall disposed only within said casing, each of said partition walls having at least a respective one of said penetration pipes extending therethrough from one of said discrete spaces and into another of said discrete spaces adjacent thereto, each of said penetration pipes having terminal ends located in the adjacent said one and another discrete spaces such that the penetration pipe introduces exhaust gas from said one of said discrete spaces into the another of the discrete spaces adjacent thereto, and the total cross-sectional area of the at least one penetration pipe extending through each said partition wall being substantially less than that of both said one of said discrete spaces from which the at least one pipe extends and said another of said discrete spaces adjacent thereto such that a portion of said gas passage is reduced at an inlet end of the at least one penetration pipe and expanded at an outlet end of the at least one penetration pipe to such an extent that the noise of gas flowing along said gas passage through said at least one penetration pipe is reduced, and an outlet pipe placing one of said discrete spaces in communication with the outside of said casing; and a catalyzer provided inside each of the penetrating pipes extending through at least one of said partition walls.

2. A catalyzer as claimed in claim 1, wherein each of said partition walls has only one said penetrating pipe extending therethrough.

3. A catalyzer as claimed in claim 1, wherein each of said partition walls has a plurality of said penetrating pipes extending therethrough.

4. A catalyzer as claimed in claim 1, wherein said casing has one of a circular, rectangular and elliptical cross section.

5. A catalyzer as claimed in claim 4, wherein said outer casing includes blind plates at opposite axial ends thereof, and said inlet pipe and said outlet pipe extend through said blind plates, respectively.

6. A catalyzer as claimed in claim 1, wherein said inlet and said outlet pipes each extend into said casing from the outside thereof.

7. A catalyzer as claimed in claim 1, wherein said catalyzer includes material which will effect at least one of dinatration and desulfuration of exhaust gas.

* * * * *

UNITED STATES PATENT AND TRADEMARK OFFICE
CERTIFICATE OF CORRECTION

PATENT NO. : 5,457,290

DATED : October 10, 1995

INVENTOR(S) : Toshitsugu SASE et al.

It is certified that error appears in the above-indentified patent and that said Letters Patent is hereby corrected as shown below:

Title page,
 In the Foreign Application Priority Data of item [30]
    "Jul. 11, 1990" has been changed to —Nov. 7, 1990—.

Signed and Sealed this

Twelfth Day of March, 1996

Attest:

BRUCE LEHMAN

Attesting Officer    Commissioner of Patents and Trademarks